United States Patent [19]
Passerell et al.

[11] Patent Number: 5,149,054
[45] Date of Patent: Sep. 22, 1992

[54] REINFORCED POLYMER VALVE

[75] Inventors: David P. Passerell, Geneva; Stan Skrbis, Richmond Heights, both of Ohio

[73] Assignee: Perfection Corporation, Madison, Ohio

[21] Appl. No.: 622,713

[22] Filed: Dec. 5, 1990

Related U.S. Application Data

[63] Continuation-in-part of Ser. No. 360,292, Jun. 2, 1989, abandoned.

[51] Int. Cl.$^5$ .............................................. F16K 5/04
[52] U.S. Cl. ..................................... 251/309; 251/358
[58] Field of Search ............... 251/304, 309, 358, 366, 251/368, 367

[56] References Cited

U.S. PATENT DOCUMENTS

| | | | |
|---|---|---|---|
| 2,433,732 | 12/1947 | Brown | 251/103 |
| 3,000,608 | 9/1961 | Williams | 251/367 X |
| 3,133,722 | 5/1964 | McGuire et al. | 251/309 |
| 3,168,280 | 2/1965 | Mueller | 251/217 |
| 3,381,736 | 5/1968 | Ford et al. | 152/362 |
| 3,458,611 | 7/1969 | Roberts | 264/93 |
| 3,484,516 | 12/1969 | Simons | 264/254 |
| 3,605,792 | 9/1971 | Westbrook | 137/312 |
| 3,882,884 | 5/1975 | Leopold, Jr. et al. | 137/327 |
| 3,990,675 | 11/1976 | Bonafous | 137/375 X |
| 4,014,513 | 3/1977 | Blake et al. | 251/317 |
| 4,015,816 | 4/1977 | Semon | 251/285 |
| 4,051,866 | 10/1977 | Bake et al. | 137/556.3 |
| 4,171,711 | 10/1979 | Bake et al. | 137/312 |
| 4,397,446 | 8/1983 | Jelinek | 251/309 |
| 4,448,741 | 5/1984 | Schad | 264/251 |
| 4,488,741 | 12/1984 | Conley et al. | 285/250 |
| 4,494,730 | 1/1985 | George | 251/309 |
| 4,511,120 | 4/1985 | Conley et al. | 251/288 |
| 4,744,390 | 5/1988 | Henry | 137/797 |
| 4,988,077 | 1/1991 | Conley et al. | 251/309 |

FOREIGN PATENT DOCUMENTS 2040408 8/1980 United Kingdom.

Primary Examiner—John C. Fox
Attorney, Agent, or Firm—Fay, Sharpe, Beall, Fagan, Minnich & McKee

[57] ABSTRACT

A plug valve includes a molded polymeric valve body having a bore extending therethrough. Inlet and outlet branch passages are integrally molded with the valve body and communicate with the bore. A valve member is received in the bore and is adapted for rotation between open and closed positions for regulating fluid flow through the plug valve. The valve body includes a metal reinforcing member molded therein. Centering rings formed from substantially the same polymer as the valve body are received on opposite ends of the reinforcing member to completely encapsulate the reinforcing member. The reinforcing member is received concentrically around the bore to maintain close dimensional tolerances between the valve member and valve body.

30 Claims, 4 Drawing Sheets

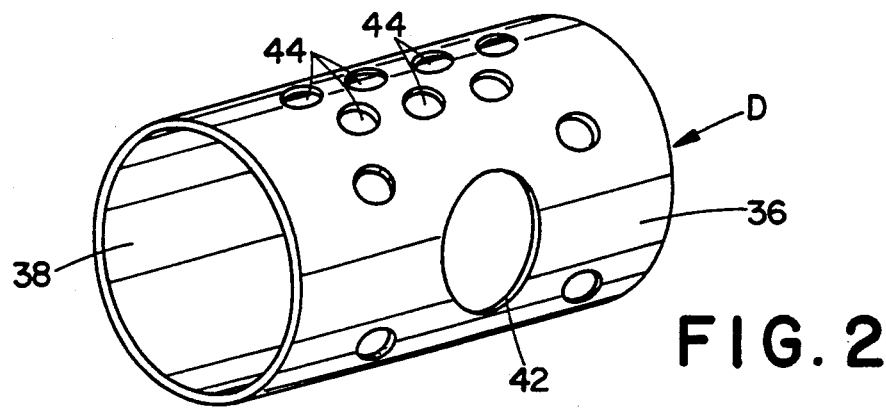
FIG.2
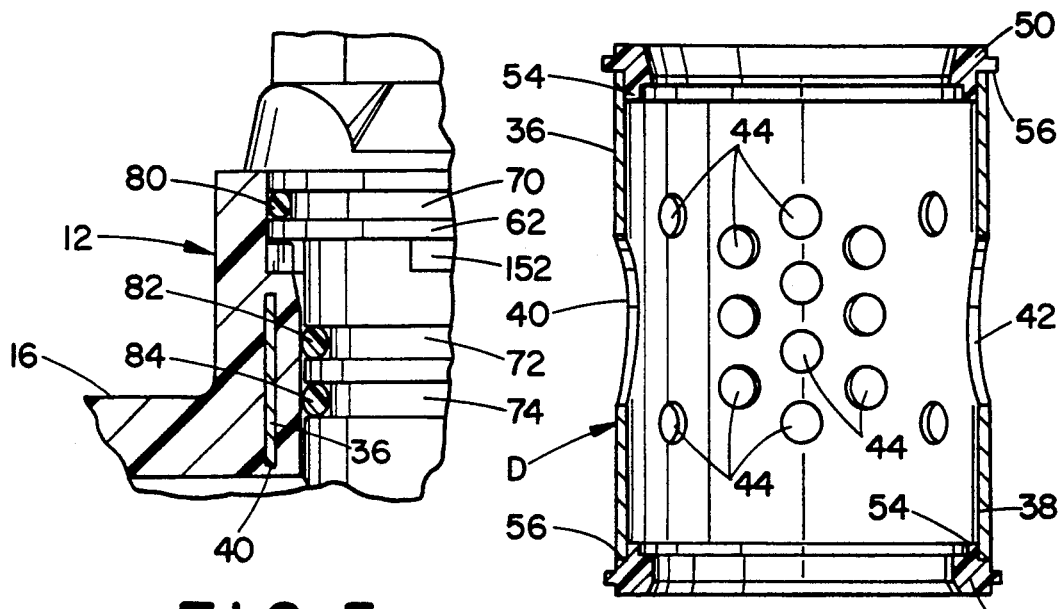
FIG.5
FIG.3
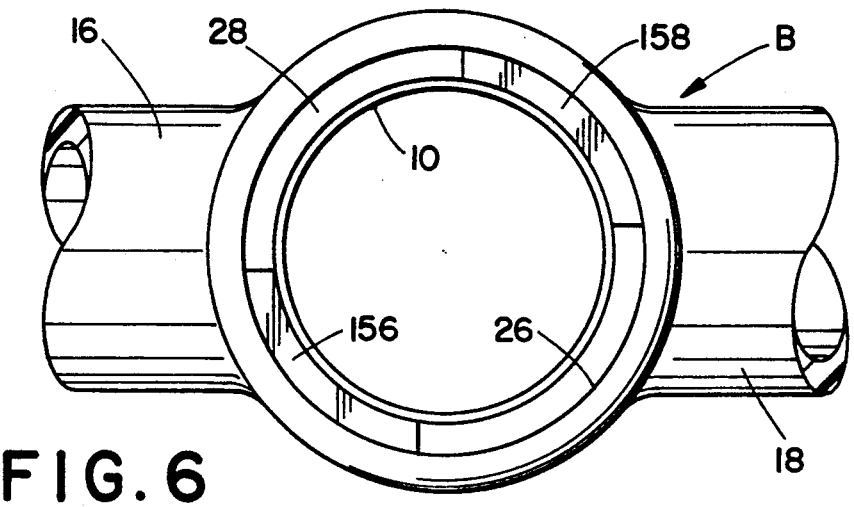
FIG.6

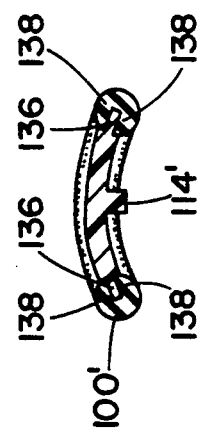
FIG. 8
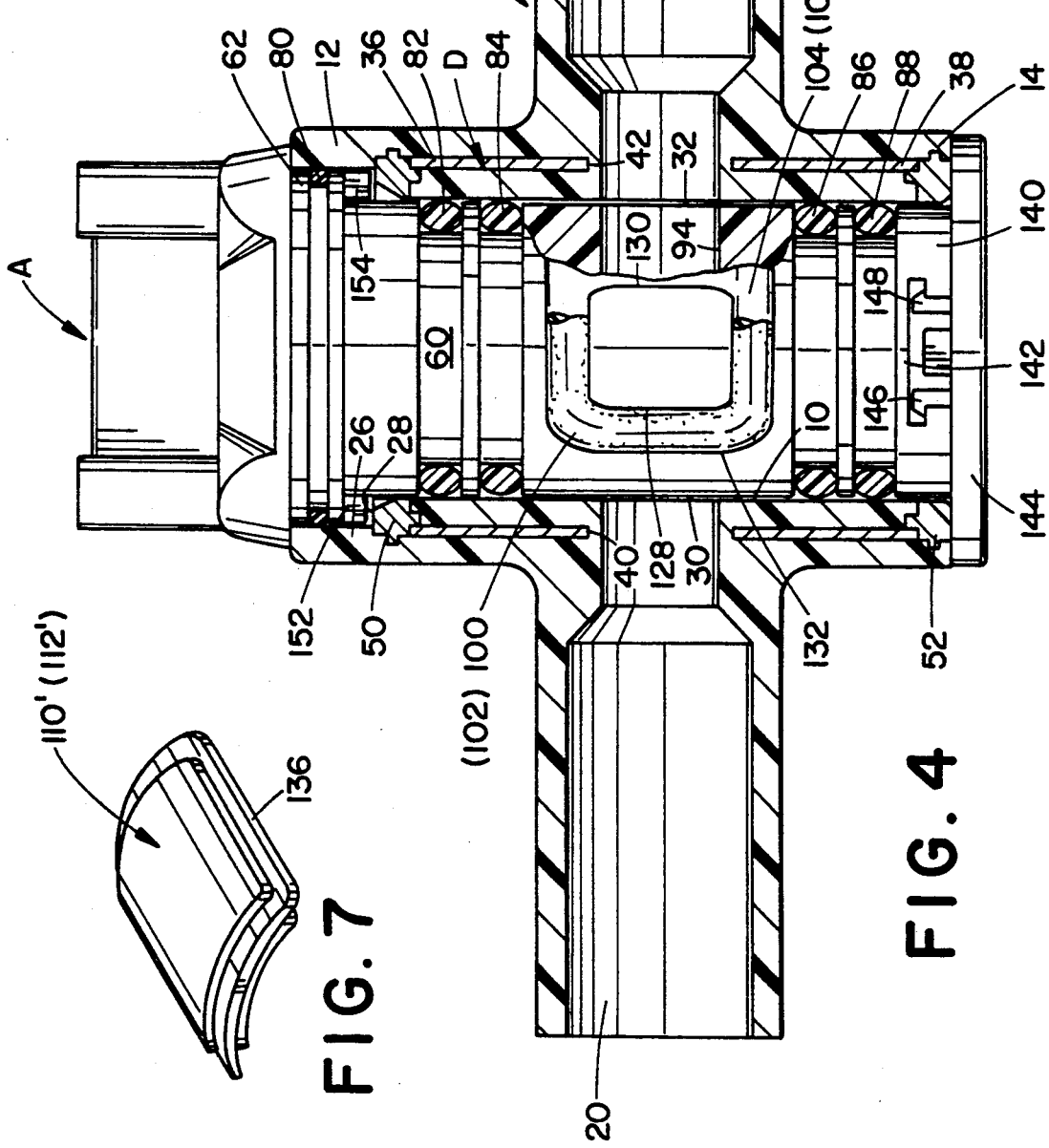
FIG. 7
FIG. 4

REINFORCED POLYMER VALVE

BACKGROUND OF THE INVENTION

This application is a continuation-in-part of copending application Ser. No. 360,292, filed Jun. 2, 1989, now abandoned.

This invention pertains to the art of valves and more particularly to plug valves.

The invention is applicable to shutoff valves utilized by the gas industry that are normally disposed underground and will be described with particular reference thereto. However, it will be appreciated that the invention has broader applications and may be advantageously employed in still other environments and applications.

Gas distribution has undergone a marked change with the introduction of polymeric materials used in forming gas distribution components, i.e., pipes, couplings, valves, etc. The polymeric materials have the distinct advantage of not corroding whereas metal components previously used in the industry suffered from corrosion problems. On the other hand, various problems have been encountered as a result of the changeover to polymeric materials.

Some success has been realized in the overall strength of components formed from polymeric materials. This success has promoted an even greater interest and use of polymeric material in the industry. Notwithstanding these advances in the art, a persistent problem remains in maintaining an effective seal between a selectively movable valve member and an associated valve body.

It is believed that a major reason for not attaining an effective valve member/valve body seal is the tolerance control problems associated with molding polymeric components. The polymeric material experiences shrinkage during the molding process which interferes with the overall objective of dimensional stability. Stated in another manner, since close dimensional tolerancing is difficult to achieve due to the inherent shrinkage associated with molding polymeric materials, larger gaps between valve components must be maintained. This, in turn, requires a seal member to be oversized or effective over a greater area to adequately seal the valve.

Molding cycle time is also a constraint in production of polymeric materials because of the necessity of curing the material. Again, dimensional control must be attended to during the curing process which results in increased cycle time. Thus, an increase in dimensional control will reduce molding cycle time.

SUMMARY OF THE INVENTION

The present invention contemplates a new and improved valve of polymeric construction particularly adapted for underground installation and method of molding same.

According to the present invention, there is provided a valve body molded from a polymeric material. A valve member is closely received in a bore of the valve body and adapted for selective rotation between open and closed positions. A reinforcing member is received in the body for maintaining close dimensional tolerances between the valve member and body.

According to a further aspect of the invention, the reinforcing member is defined by a generally cylindrical sleeve that is integrally molded in the valve body.

According to a still further aspect of the invention, means for anchoring the reinforcing member to the valve body is provided.

According to another aspect of the invention, centering rings are disposed on opposite ends of the reinforcing member to provide complete encapsulation in the valve body.

According to a still further aspect of the invention, means are provided for maintaining accurate positioning of the reinforcing member in the valve body.

According to yet another aspect of the invention, the valve structure includes tamperproof structural features.

According to a still further aspect of the invention, a moisture seal member is disposed internally of the valve body and externally of a valve stop means to inhibit ice buildup that may adversely interfere with operation of the valve.

According to another aspect of the invention, an insert is provided between an end cap and the valve member to inhibit moisture retention and eliminate freeze/thaw cycling problems.

A principal advantage of the invention resides in the dimensional stability and close dimensional tolerancing between the movable valve member and valve body.

Another advantage is the reduced shrinking that occurs during molding.

Yet another advantage of the invention is found in the increase in hoop stress resulting from incorporation of a reinforcing member.

A further advantage is realized by the faster cycle time in forming the valve components.

The extended useful life is still another advantage offered by the subject new valve construction.

Detection of the valve is also advantageously enhanced through incorporation of a reinforcing member in the valve body.

A still further advantage resulting from the subject invention is found in the lack of corrosion of the reinforcing member due to encapsulation in the valve body.

Still other advantages and benefits of the invention will become apparent to one skilled in the art upon a reading and understanding of the following detailed description.

BRIEF DESCRIPTION OF THE DRAWINGS

The invention may take physical form in certain parts and arrangement of parts, preferred and modified embodiments and method of which will be described in detail in this specification and illustrated in the accompanying drawings which form a part hereof, and wherein:

FIG. 2 is a perspective view of the reinforcing member of the subject invention prior to being encapsulated in the valve body;

FIG. 3 is a longitudinal cross-section of the reinforcing member with centering rings disposed at either end;

FIG. 4 is a partial, vertical cross-sectional view of the assembled valve in a valve open position;

FIG. 5 is an enlarged detailed view of the valve plug inserted in the valve body and particularly illustrating the moisture ring and valve stop arrangement;

FIG. 6 is a top plan view of the valve body;

FIG. 7 is a perspective view of an alternative seal member and retaining member arrangement;

FIG. 8 is a cross-sectional view taken generally along the lines 8—8 of FIG. 7;

DETAILED DESCRIPTION OF THE PREFERRED EMBODIMENT AND METHOD

Figure 1:
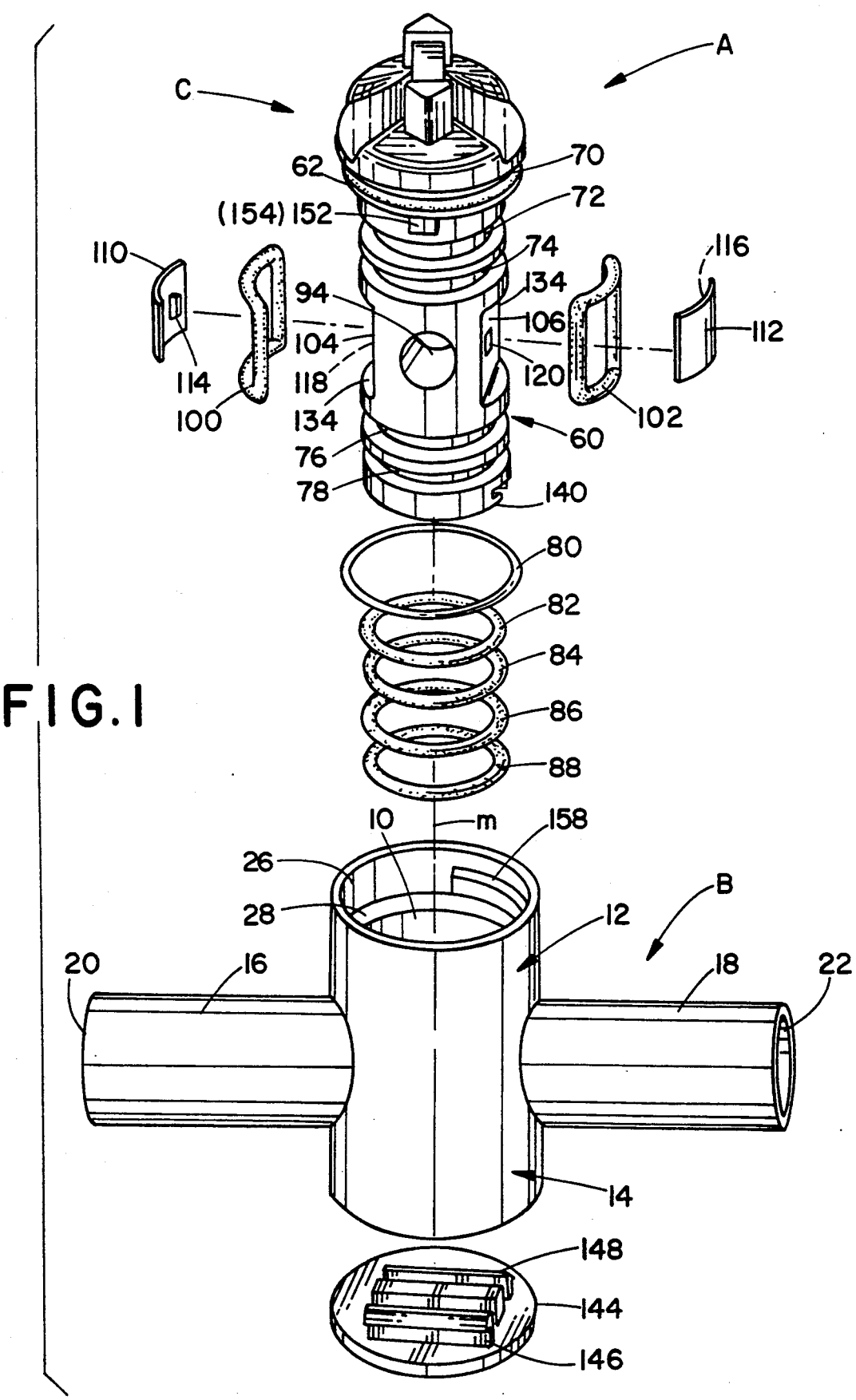
FIG. 1 is an exploded, perspective view of the subject new valve.

Referring now to the drawings wherein the showings are for purposes of illustrating the preferred embodiment and method of molding the invention only and not for purposes of limiting same, the Figures show a plug valve A comprising a valve body B receiving a valve member C therein. A reinforcing member D is encapsulated into the valve body for purposes that will become more apparent below.

More particularly and with reference to FIG. 1, the valve body B is an integrally molded polymer construction having a bore or chamber 10 defined along a first axis "m". The bore extends completely through the valve body from a first or upper end 12 to a second or lower end 14. Disposed intermediately of the first and second ends are first and second branches or passages 16, 18. The branches are disposed in generally collinear relation and intersect the bore in generally perpendicular relation. Of course other branch configurations may be used without departing from the scope and intent of the subject invention. The branches 16, 18 define an inlet 20 and outlet 22 to the bore for selective communication of fluid therethrough.

As best illustrated in FIG. 4, the internal diameters of the inlet and outlet 20, 22 change as they extend axially from the bore to increase throughflow. Although the illustrated taper is approximately 45°, still other transitional angles can be used. It is preferred, though, to use a more gradual change, for example on the order of approximately 10°, to provide smoother flow.

Referring again to FIG. 1, a coaxial counterbore 26 is defined adjacent the first end of the valve body. The bore and counterbore cooperate to form a generally radially extending shoulder 28 located axially inward a predetermined dimension from the terminal edge of the valve body upper end 12. The remainder of the valve body interior is generally smooth walled and continuous except where the bore communicates with the inlet and outlet to define ports 30, 32 (FIG. 4).

The reinforcing member D is defined by a generally cylindrical sleeve formed of a perforated metal tubing, or perforated metal sheet that is rolled and tack welded to define a cylinder, as best illustrated in FIG. 2. A first end 36 and second end 38 of the reinforcing member are both open and define a diametrical dimension slightly greater than the diametrical dimension of the valve body bore 10. The axial dimension of the reinforcing member is adapted to extend substantially the full axial dimension of the bore 10 and in the preferred arrangement does not extend into the counterbore 26 (FIGS. 4 and 5).

The reinforcing member includes two major, radially extending openings 40, 42. These openings 40, 42 are dimensioned to be slightly greater than the inlet and outlet passages 16, 18 so as not to interfere with fluid flow therethrough. As shown in FIGS. 3 and 4, the openings are diametrically disposed from one another to conform with the branch configuration of the valve body.

A plurality of smaller diameter apertures 44 extend through the sidewall of the reinforcing member. The apertures define a means for anchoring the reinforcing member in the valve body. Specifically, the reinforcing member is received in a molding cavity (not shown) so that the reinforcing member is spaced from the molding cavity walls. Injection of the polymer material in a fluid state completely encapsulates the reinforcing member. The apertures 44 permit the polymer material to flow through the sidewall of the reinforcing member and once cured provide an effective anchoring means between the composite valve body materials. As is apparent in FIG. 4, the openings 40, 42 are coated with the polymeric material and dimensioned to define the inlet and outlet ports 30, 32 communicating with the valve bore.

Encapsulation and support of the reinforcement member during the molding process is facilitated through the use of polymeric centering rings 50, 52. Preferably, these centering rings are formed of the same polymeric material as the remainder of the valve body. In this manner, once molding is complete, the centering rings become integrally molded with the valve body.

Each centering ring includes an axially extending rim 54 closely received in the inner diameter of the reinforcing member to radially position the reinforcing member during molding. Likewise, a generally radially extending shoulder 56 on each centering ring abuttingly engages opposed ends of the reinforcing member to axially position the reinforcing member during molding.

With the centering rings received on the reinforcing member as shown in FIG. 3, support during molding is provided by a core pin that extends through the reinforcing member. The core pin engages the centering rings which, in turn, engage the reinforcing member. Thus, there is no direct contact between the core pin and reinforcing member during molding. Since the centering rings are constructed from the same polymer as used to mold the valve body, the reinforcing member can be completely encapsulated by the polymeric material without any resulting exposed surface once the molding process is complete.

Incorporation of the reinforcing member into the valve body provides for close dimensional tolerancing between the valve member and associated body. Specifically, the bore of the valve body can be held to a closer tolerance during molding. The reinforcing member also reduces shrinkage during the molding operation of the valve body. This assures that the predetermined dimensioning of the valve body is maintained after the part has been molded. Overall resistance to hoop stress of the valve body is also increased through incorporation of the more rigid reinforcing member. This permits the valve to continue to operate even under the influence of compressive stresses imposed by the external environment.

The manufacturing rate of the valve body is also increased through use of the reinforcing member. Molding cycle time is decreased as a result of incorporating the reinforcing member into the valve body.

Since the reinforcing member is entirely encapsulated within the polymer construction, there is also no problem with corrosion. The metallic construction of the reinforcing member also offers the advantage that it may be readily detected by a metal detector. Since valves of this type are often buried underground for service line use, repairmen can easily detect the location of the valve with a conventional metal detector.

The valve member C is defined by a generally cylindrical first or lower portion 60 closely received in the bore 10 (FIGS. 1 and 4). A land 62 is disposed adjacent the first or upper end 64 of the valve member and is dimensioned for close receipt within the counterbore 24. A series of five circumferentially extending grooves 70, 72, 74, 76, 78 are axially spaced along the valve member. Each of these grooves is adapted to receive a corresponding seal member such as O-rings 80, 82, 84, 86, 88 that seal between the selectively rotatable valve member C and the valve body B. The first groove 70 is defined on the land while the remaining grooves are axially spaced in pairs 72, 74 and 76, 78 along the lower portion 60. The groove pairs are disposed above and below the intersection of the inlet and outlet branches with the valve bore and, therefore, define primary seals 84, 86 and associated back-up seals 82, 88. The O-ring 80, on the other hand, defines a moisture seal that inhibits ingress of moisture to the valve bore from the external environment.

A central passage 94 extends entirely through the valve member C at an area disposed between the seal ring pairs. Preferably, the passage is aligned with the inlet and outlet so that selective rotation of the valve member relative to the body opens and closes the valve in a manner well known in the art. Disposed approximately 90° from the central passage are first and second rectangular seal members 100, 102. The rectangular seal members are received in generally rectangular recesses 104, 106. Retaining members 110, 112 are also generally rectangular and received in respective recesses 104, 106. Flanges 114, 116 extend from interior faces of the retaining members for snap-fit relation with openings 118, 120 centrally disposed in the recesses 104, 106. An adhesive may also be used with the snap-fit arrangement to insure adequate retention of the rectangular seal member.

The longitudinally extending edges 128, 130 of each retaining member has a bevelled configuration. These edges 128, 130 cooperate with bevelled side edges 132, 134 of each recess to define an inverted V-shaped groove or dove-tail arrangement that aids in retention of the rectangular seal member. Rotation of the valve member to a closed position locates the retaining members over the inlet and outlet ports 30, 32. The rectangular sealing members completely encompass the ports and prohibit communication therebetween.

An alternative arrangement for retaining the rectangular seal member is illustrated in FIGS. 7 and 8. For purposes of brevity and to facilitate discussion, like numerals with a primed suffix (') will refer to like elements and new numerals will refer to new elements. The retaining member 110' is modified through addition of a narrow flange or extension 136 that extends around the entire periphery of the retaining member. The peripheral flange is disposed at approximately mid-height of the retaining member. The retaining member is then introduced into a separate molding operation where the rectangular seal member 100' is molded to the retaining member.

With particular reference to FIG. 8, the advantage offered by the integral flange is most apparent. The seal member 100' forms gripping lip portions 138 that extend on opposite sides of the peripheral flange 136. The separate molding operation of the sealing member provides a tenacious bond between the elastomeric sealing member and the polymeric material of the retaining member. This integrally molded seal/retaining member arrangement is substantially immune to seal extrusion or blowout when the valve is exposed to high pressure situations. Once the seal molding operation is complete, the combined seal/retaining member is secured to the valve member C by means of the snap-fit relation between the flange 114' and the opening 118. As will also be apparent to those skilled in the art, the above description is fully applicable to the retaining member 112'.

Referring again to FIGS. 1 and 4, a lower end 140 of the valve member includes a generally T-shaped recess 142 that cooperates with end cap 144. The end cap includes first and second generally L-shaped flanges 146, 148 that snap-fit into the T-shaped recess and prevent removal of the valve member once it is inserted into the bore. This provides a tamperproof construction since the end cap engages the lower end 14 of the valve body along a circumferentially continuous rim surface 150. The end cap thus slidably rotates with the valve member relative to the valve body as the valve member is selectively actuated between open and closed positions.

Rotational motion of the valve member is limited to provide a positive indication of valve open and closed positions. The subject valve incorporates a valve stop arrangement that limits the valve member, once installed in the valve body, to a 90° range of movement, i.e., fully open and fully closed positions.

With particular reference to FIGS. 5 and 6, the valve stop arrangement is illustrated in greater detail. Specifically, the valve member includes first and second lobes 152, 154 that extend axially outward from the land 62 for close receipt in the counterbore of the valve body. Specifically, the lobes are received immediately adjacent the shoulder 28 and cooperate with first and second stop members 156, 158 extending axially outward from the shoulder. Each of the stop members includes tapered edges 160, 162. The tapered edges increase the shear limit and, as a consequence, the stop members on the valve body will shear if the valve member is overturned.

The stop members are preferably disposed internally of the moisture seal ring 82 to limit formation of ice that would otherwise interfere with operation of the valve member. It is believed that ice buildup, in effect, creates "temporary" stop members that interfere with rotational movement of the valve member between the open and closed positions. The moisture seal ring advantageously prevents ingress of moisture so that full open and closed positions are defined only through abutting engagement between the lobes 152, 154 and st op members 156, 158.

The valve member is specially configured at its upper end. The configuration may vary widely but is adapted to receive a tool (not shown) for selectively actuating the valve member. As shown in FIG. 1 the valve member upper end forms a double arrowhead to represent the alignment of central passages 94 with the inlet and outlet. An installer can thus easily determine if the valve is in an open or closed position. For example, alignment of the arrowheads with the branches would indicate a valve open position. Still other indicia may be utilized without departing from the intent of the subject invention.

To assemble the subject plug valve, the reinforcing member is formed into a cylinder, if required, by securing opposed edges together such as by tack welding.

The centering rings 50, 52 are then inserted into opposite ends of the reinforcing member. Particularly, axial rims 54 are inserted into the reinforcing member until shoulders 56 engage the terminal ends thereof. The reinforcing member with the attached centering rings is then aligned in a mold cavity by means of a core pin (not shown). A polymeric material is then injected into the mold and encapsulates the reinforcing member. As described above, the centering rings are preferably formed of the same material as the polymeric material so that the centering rings are essentially merged into the molded body.

The valve member is separately assembled, positioning the O-rings 80, 82, 84, 86, 88 into their respective grooves 70, 72, 74, 76, 78. The rectangular seal members 100, 102 and retaining members 110, 112 are also secured to the valve member. Alternatively, the combined seal/retaining members 110', 112' are secured to the valve member. The valve member is then inserted into the valve body and the tamper-proof end cap 144 secured thereto.

Figure 9:
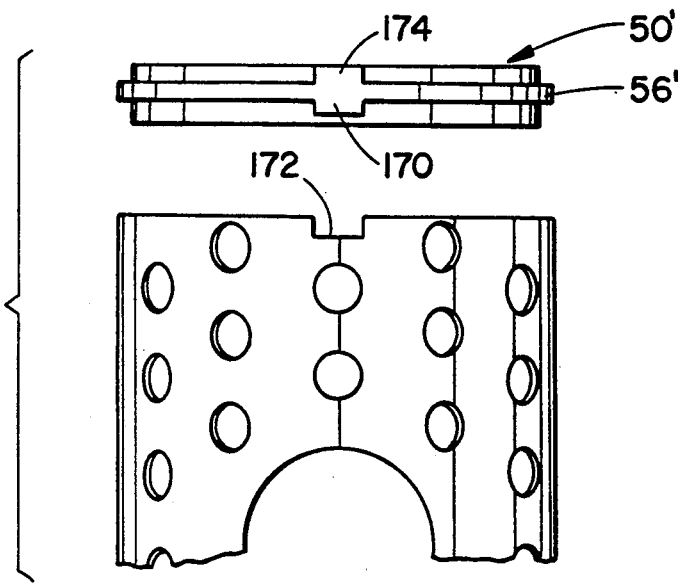
FIG. 9 is an enlarged side elevational view of a portion of a modified reinforcing member and centering ring.
Figure 10:
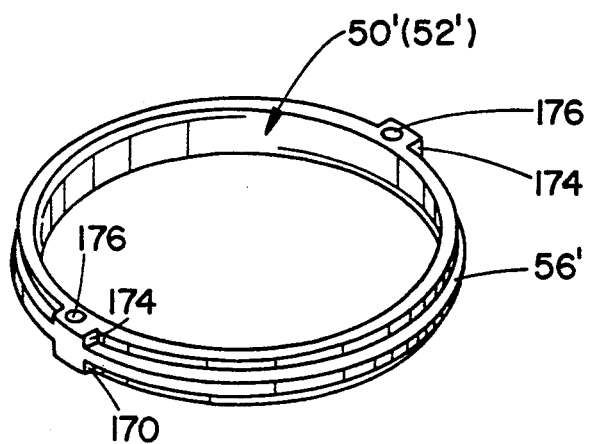
FIG. 10 is a perspective view of the modified centering ring of FIG. 9.
Figure 11:
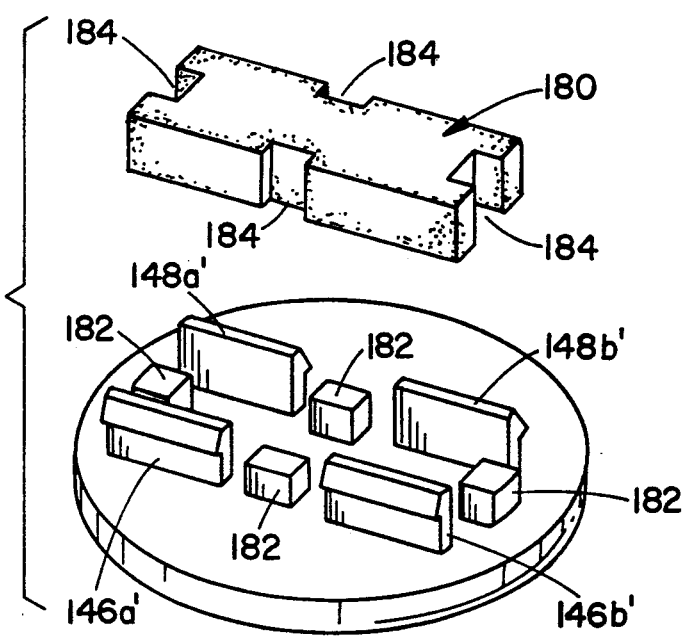
FIG. 11 is a perspective view of a modified end cap and insert.

Another modification to the assembly is more particularly illustrated in FIGS. 9 and 10. Again, for purposes of brevity and to facilitate discussion, like numerals with a primed suffix (') will refer to like elements and new numerals will refer to new elements.

One or both of the centering rings 50', 52' is modified to stabilize the reinforcing member D' during formation of the valve body. Specifically, means for limiting rotational movement between the centering ring and the reinforcing member is provided. According to a preferred arrangement, the limiting means is defined by a protrusion 170 extending axially from shoulder 56' and adapted for receipt in recess 172 in the first end 36' of the reinforce member. This arrangement locks or keys the centering ring and the reinforcing member together.

Additionally, a second protrusion 174 extends from the shoulder in a direction axially opposite from the first protrusion. The second protrusion preferably includes a recessed opening or blind hole 176 that is lockingly engaged with the associated core pin (not shown). In this manner, the centering ring is aligned with the core pin through opening 176 and the centering ring is aligned, in turn, with the reinforcing member through the protrusion 170 and recess 172. This assures that openings 40', 42' in the reinforcing member are accurately aligned with the inlet and outlet during molding of the valve body.

Another modification to the plug valve, particularly the end cap, overcomes freezing and thawing cycle problems. A resilient, deformable insert 180 is received between flanges 146', 148'. Preferably, the insert is constructed of a foamed plastic and substantially fills the area between the flanges in the end cap and the recess 142' in the valve member.

The flanges are each divided into two parts, namely 146a', 146b' and 148a', 148b'. A series of half-height blocks 182 are interposed between the flange parts and are received in notches 184 formed in the periphery of the insert. The blocks and notches securely retain the insert in position between the flanges.

The insert has an uncompressed height greater than the height of the flanges 146', 148'. This arrangement allows the insert to contact the base of the valve member, particularly in the recess, and be compressed to a decreased height substantially identical to the height of the flanges once assembly of the plug valve is complete. The compression of the insert substantially fills the voids between the end cap and valve member recess. This limits the potential for moisture entrapment that during freeze/thaw cycling may impose forces on the end cap urging it to pop off the valve member.

The invention has been described with reference to the preferred embodiment. Obviously, modifications and alterations will occur to others upon a reading and understanding of the specification. For example, various polymer materials may be utilized without departing from the overall intent and scope of the subject invention. Among the preferred polymers are nylon, acetyl, polyester and polyamide. It is intended to include all such modifications and alterations insofar as they come within the scope of the appended claims or the equivalents thereof.

Having thus described the invention, it is now claimed:

1. A valve comprising:
   a body of polymeric material having a chamber defined therein;
   inlet and outlet passages operatively communicating with the chamber;
   a valve member received in the chamber for selective rotation about an axis between open and closed positions;
   a reinforcing member received in the body around the chamber for maintaining close dimensional tolerances between the valve member and the body; and
   first and second centering rings operatively engaging the reinforcing member at axially spaced regions, the centering rings stabilizing the reinforcing member during formation of the body so that the reinforcing member is totally encapsulated.

2. The valve as defined in claim 1 further comprising means for limiting rotational movement between at least one centering ring and the reinforcing member.

3. The valve as defined in claim 2 wherein the limiting means includes a recess formed in one of the centering rings and the reinforcing member and a protrusion defined in the other of the centering rings and the reinforcing member and adapted for receipt in the recess.

4. The valve as defined in claim 3 further comprising means adapted for limiting rotation between at least one centering ring and an associated core pin during formation of the body.

5. The valve as defined in claim 1 wherein the inlet and outlet passages change in cross sectional dimension as they extend away from the chamber.

6. The valve as defined in claim 5 wherein the inlet and outlet passages decrease in diameter as they extend from the chamber.

7. The valve as defined in claim 1 further comprising an end cap lockingly engaging one end of the valve member for preventing removal of the valve member from the body.

8. The valve as defined in claim 7 further comprising an insert interposed between the end cap and the valve member to limit the accumulation of moisture therebetween.

9. The valve as defined in claim 8 wherein the insert is a resilient, deformable material.

10. The valve as defined in claim 8 wherein the insert is a foam material.

11. The valve as defined in claim I wherein the centering rings are formed of substantially the same polymeric material as the body and readily fuse therewith during formation of the body.

12. The valve as defined in claim 1 wherein the reinforcing member is disposed coaxially with the axis of the valve member.

13. The valve as defined in claim 1 further comprising means for anchoring the reinforcing member to the body.

14. The valve as defined in claim 13 wherein the anchoring means includes plural apertures in the reinforcing member through which the polymeric material of the body can pass.

15. The valve as defined in claim 1 wherein the reinforcing member includes first and second enlarged openings adapted for selective alignment with the inlet and outlet passages.

16. A plug valve comprising:
a molded plastic valve body having a bore extending therethrough, and including first and second branches integrally molded therewith defining an inlet and outlet communicating with the bore;
a valve member having a passage therethrough and received in the bore, the valve member adapted for rotation about a first axis so that the passage selectively communicates with the inlet and outlet;
means for maintaining close dimensional tolerance between the valve member and the body, the tolerance maintaining means including a rigid, cylindrical reinforcing sleeve completely encapsulated in and integrally molded into the body and extending along the first axis;
at least one elastomeric seal means interposed between the valve member and body to prevent fluid communication between the inlet and outlet in a valve closed position; and
an end cap received at one end of the body to close the bore, the end cap including a flange adapted for receipt in a generally T-shaped groove on one end of the valve member to lick the valve member against removal from the valve body.

17. The plug valve as defined n claim 16 further comprising means for anchoring the reinforcing sleeve in the valve body.

18. The plug valve as defined in claim 17 wherein the reinforcing sleeve includes first and second openings adapted for alignment with the inlet and outlet.

19. The plug valve as defined in claim 18 wherein the anchoring means is defined by plural apertures facilitating the flow of molding material therethrough during valve body molding.

20. The plug valve as defined in claim 16 further comprising means for limiting rotation of the valve member relative to the valve body.

21. The plug valve as defined in claim 20 wherein the limiting means is located in the valve body.

22. The valve as defined in claim 16 wherein the elastomeric seal means and the body are formed from different materials.

23. A valve comprising:
a body of molded polymeric material having a chamber defined therein;
inlet and outlet passages operatively communicating with the chamber;
a valve member closely received in the chamber for selective rotation between open and closed positions;
a reinforcing member received in the body for maintaining close dimensional tolerances between the body and valve member; and an end cap having a flange for lockingly engaging a generally T-shaped groove on one end of the valve member and a peripheral rim engaging the body for preventing removal of the valve member from the body.

24. The valve as defined in claim 23 wherein the reinforcing member is disposed coaxially with a rotational axis of the valve member.

25. The valve as defined in claim 23 wherein the reinforcing member includes first and second openings aligned with the inlet and outlet passages.

26. A plug valve comprising:
a molded plastic valve body having a bore extending therethrough, and including first and second branches integrally molded therewith defining an inlet and outlet communicating with the bore;
a valve member having a passage therethrough and received in the bore, the valve member adapted for rotation about a first axis so that the passage selectively communicates with the inlet and outlet;
a rigid, circumferentially continuous reinforcing sleeve integrally molded into the body and extending along the first axis for maintaining close dimensional tolerances between the valve member and valve body, the reinforcing member including plural apertures ;
first and second centering rings operatively associated with the reinforcing member at spaced regions, the centering rings being formed from substantially the same plastic as the valve body and fusing therewith during formation of the valve body; and
an end cap having a flange adapted for receipt in a generally T-shaped groove on one end of the valve member for locking the valve member against removal from the valve body.

27. The plug valve as defined in claim 26 further comprising means for limiting rotation between at least one centering ring and the reinforcing member.

28. A method of molding a plug valve body used in a plug valve, the plug valve having a valve member selectively movable between open and closed positions in a bore of a valve body, the method comprising the steps of:
providing a generally rigid reinforcing member;
positioning the reinforcing member in a mold cavity;
providing at least one centering ring of polymeric material;
placing the centering ring on one end of the reinforcing member; and,
molding a polymeric material around the reinforcing member such that a central axis of the reinforcing member is parallel to the valve body bore.

29. The method as defined in claim 28 comprising the further step of providing a second centering ring of polymeric material and placing the second centering ring on an opposite end of the reinforcing member.

30. The method as defined n claim 29 comprising the further step of keying the centering rings to the opposite ends of the reinforcing member.

* * * * *